United States Patent
Sun et al.

(10) Patent No.: US 7,165,403 B2
(45) Date of Patent: Jan. 23, 2007

(54) SERIES/PARALLEL TURBOCHARGERS AND SWITCHABLE HIGH/LOW PRESSURE EGR FOR INTERNAL COMBUSTION ENGINES

(75) Inventors: Harold Sun, West Bloomfield, MI (US); William Ruona, Farmington Hills, MI (US); Richard Baker, Dearborn Heights, MI (US); Edward King, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/710,678

(22) Filed: Jul. 28, 2004

(65) Prior Publication Data

US 2006/0021347 A1 Feb. 2, 2006

(51) Int. Cl.
*F02B 33/44* (2006.01)
*F02B 37/00* (2006.01)
*F02B 37/02* (2006.01)
*F02B 37/12* (2006.01)
*F02M 25/07* (2006.01)
*F02B 47/08* (2006.01)

(52) U.S. Cl. ...................... 60/612; 60/605.2
(58) Field of Classification Search ............ 60/612, 60/605.2; F02B 37/00, 37/02, 37/12
See application file for complete search history.

(56) References Cited

U.S. PATENT DOCUMENTS

| | | | |
|---|---|---|---|
| 3,250,068 A | 5/1966 | Vulliamy | 60/612 |
| 3,576,102 A | 4/1971 | West | 60/612 |
| 3,906,729 A | 9/1975 | Connor et al. | 60/612 |
| 4,453,381 A * | 6/1984 | Dinger | 60/612 |
| 4,709,552 A | 12/1987 | Rutschmann et al. | 60/612 |
| 4,930,315 A | 6/1990 | Kanesaka | 60/612 |
| 5,142,866 A | 9/1992 | Yanagihara et al. | 60/612 |
| 5,199,261 A * | 4/1993 | Baker | 60/612 |
| 5,408,979 A | 4/1995 | Backlund et al. | 60/612 |
| 5,611,202 A | 3/1997 | Sumser et al. | 60/612 |
| 5,845,495 A * | 12/1998 | Schray et al. | 60/612 |
| 6,062,026 A | 5/2000 | Woollenweber et al. | 60/612 |
| 6,311,493 B1 | 11/2001 | Kurihara et al. | 60/612 |
| 6,360,732 B1 | 3/2002 | Bailey et al. | 60/612 |
| 6,418,721 B1 | 7/2002 | Coleman et al. | 60/612 |

FOREIGN PATENT DOCUMENTS

| | | | |
|---|---|---|---|
| CN | 1737346 A | * | 2/2006 |
| DE | 3817246 A1 | * | 11/1989 |
| DE | 4242494 C1 | * | 9/1993 |
| DE | 4310148 A1 | * | 10/1994 |
| DE | 19603591 C1 | * | 3/1997 |
| EP | 306829 A1 | * | 3/1989 |
| EP | 740065 A1 | * | 10/1996 |
| JP | 07293262 A | * | 11/1995 |
| JP | 08028287 A | * | 1/1996 |
| JP | 2000356136 A | * | 12/2000 |

* cited by examiner

Primary Examiner—Thai-Ba Trieu
(74) Attorney, Agent, or Firm—Diana D. Brehob; Bir Law, PLC (57) ABSTRACT

Systems and methods for turbocharging an internal combustion engine include operating two turbochargers in a series configuration for a first operating region and a parallel configuration for a second operating region. Systems and methods for controlling exhaust gas recirculation (EGR) in a turbocharged internal combustion engine provide low pressure EGR upstream of a compressor inlet for a first operating region and high pressure EGR downstream of a compressor outlet for a second operating range to further improve turbocharger operating margin and overall efficiency.

21 Claims, 7 Drawing Sheets

SERIES/PARALLEL TURBOCHARGERS AND SWITCHABLE HIGH/LOW PRESSURE EGR FOR INTERNAL COMBUSTION ENGINES

BACKGROUND OF INVENTION

1. Field of the Invention

The present invention relates to systems and methods for turbocharging and providing exhaust gas recirculation for internal combustion engines.

2. Background Art

Sizing a turbocharger for a particular engine application traditionally requires compromises to achieve a fast transient response from idle with a desired boost when launching a vehicle, especially when using exhaust gas recirculation (EGR), while providing sufficient air handling capacity at high engine speeds. Generally, a fast transient response requires a smaller turbo with lower inertia. However, a smaller turbo has limited air handling capacity for higher engine speeds. A turbo with sufficient airflow capacity for higher engine speeds generally has larger mass and inertia leading to noticeable turbo delay or lag and a less desirable transient response.

EGR handling and control strategies typically require similar compromises. At light load and low engine speed, it is desirable to increase compressor airflow so the compressor operates away from the surge limit to provide more boost. As such, it is desirable to use low pressure EGR supplied to the inlet of the compressor, preferably from downstream of the turbine to maximize turbine speed and compressor airflow. However, at higher engine speeds with higher boost and higher intake manifold pressures, it is desirable to use high pressure EGR supplied from upstream of the turbine to the outlet of the compressor to avoid choking in the compressor.

Various types of emission control devices used with turbocharged engines require a relatively high temperature to operate efficiently. However, the higher airflows and thermal inertia associated with single or twin turbochargers may often require additional warm-up time before the emission control devices reach desired operating temperatures.

A number of solutions have been proposed to address one or more of these problems. For example, single variable geometry turbochargers (VGT) or variable nozzle turbochargers (VNT) have been developed having an adjustable turbine nozzle orifice size or adjustable vane angle to make the turbine more efficient and provide higher boost at lower mass flows. However, to accommodate the higher mass flow capacity at higher engine speeds requires a larger rotor with corresponding inertia resulting in a slower transient response. To improve transient response, twin (primary/secondary) VGT's may be used in a sequential parallel operating mode as described in U.S. Pat. No. 6,055,812, for example. The smaller primary VGT has lower inertia and responds faster at vehicle launch with the larger secondary VGT joining the primary at higher engine speeds and airflows. However, this configuration includes some turbo lag or transient delay for speed-up or spooling of the secondary VGT, which is idled or not used at low engine speeds.

Another approach uses a two-stage turbocharger operated in parallel, such as described in U.S. Pat. Nos. 5,063,744 and 5,142,866, for example. In this configuration, exhaust air is fed into a small primary turbine and then a larger secondary turbine while the ambient air is compressed in a large secondary compressor followed by a second stage smaller compressor. Similar to the parallel twin configuration, the small primary turbocharger has a lower inertia for operation at lower mass flows while the secondary turbocharger has sufficient capacity for higher engine speeds and airflows. A bypass valve is used to shutdown the primary compressor and to connect the output of the secondary compressor to the intake when the air flow reaches a predetermined threshold. To handle airflow at higher engine speeds in this configuration, the required sizing and associated inertia of the secondary turbocharger compromises transient performance of the primary turbocharger leading to undesirable turbo lag or delay.

SUMMARY OF INVENTION

The present invention provides systems and methods for turbocharging an internal combustion engine that include operating two turbochargers in a series configuration for a first operating region and a parallel configuration for a second operating region. The present invention also includes systems and methods for controlling exhaust gas recirculation (EGR) in a turbocharged internal combustion engine to provide low pressure EGR upstream of a compressor inlet for a first operating region and high pressure EGR downstream of a compressor outlet for a second operating range.

Embodiments of the present invention include a system and method for controlling a turbocharged internal combustion engine having at least two turbines and associated compressors arranged to allow operation of at least the compressors in either a sequential configuration or a parallel configuration depending on current engine or ambient operating conditions. In one embodiment, twin variable geometry turbochargers are used with both the turbines and compressors switched between series and parallel configurations based on operating conditions. Another embodiment includes turbines arranged in a fixed parallel configuration with associated compressors having a switchable series/parallel configuration based on current operating conditions.

The present invention also includes embodiments having a switchable or selectable exhaust gas recirculation (EGR) based on current engine or ambient operating conditions to selectively provide low pressure EGR provided upstream of a compressor or high pressure EGR provided downstream of the compressor. In one embodiment, the EGR source is also switched from downstream relative to a first turbine to upstream of both turbines.

The present invention provides a number of advantages. For example, the selectable turbocharger configuration according to the present invention provides a two stage series configuration to generate more boost for improved vehicle launch compared to a sequential parallel configuration that only uses one stage at low engine speeds, while providing a parallel configuration to provide sufficient air handling capacity at higher engine speeds using smaller turbochargers with lower inertia to improve turbocharger efficiency and transient response across the entire operating range. The sequential operation of twin turbochargers in a series configuration followed by a parallel configuration according to the present invention provides improved performance in terms of airflow, turbo wheel speed, and air pressure build up during transients relative to previous approaches.

The switchable or floating exhaust gas recirculation according to the present invention may selectively source EGR downstream of the first turbine to provide more exhaust gas to power the first turbine with termination upstream of the compressor to improve surge margin at lower speeds while sourcing EGR upstream of the first turbine with termination downstream of the compressor at higher speeds to avoid choking at full load.

Operation of the twin turbochargers in a series configuration according to the present invention may reduce the time required for emission control or exhaust after treatment devices to reach desired operating temperatures by directing all exhaust through one or more designated devices. Optional exhaust switching according to the present invention may be used to control exhaust flow and temperatures of primary and secondary after treatment devices to conduct sequential after treatment regeneration and extend the life of the after treatment system.

The above advantages and other advantages, objects, and features of the present invention will be readily apparent from the following detailed description of the preferred embodiments when taken in connection with the accompanying drawings.

DETAILED DESCRIPTION

Figure 1:
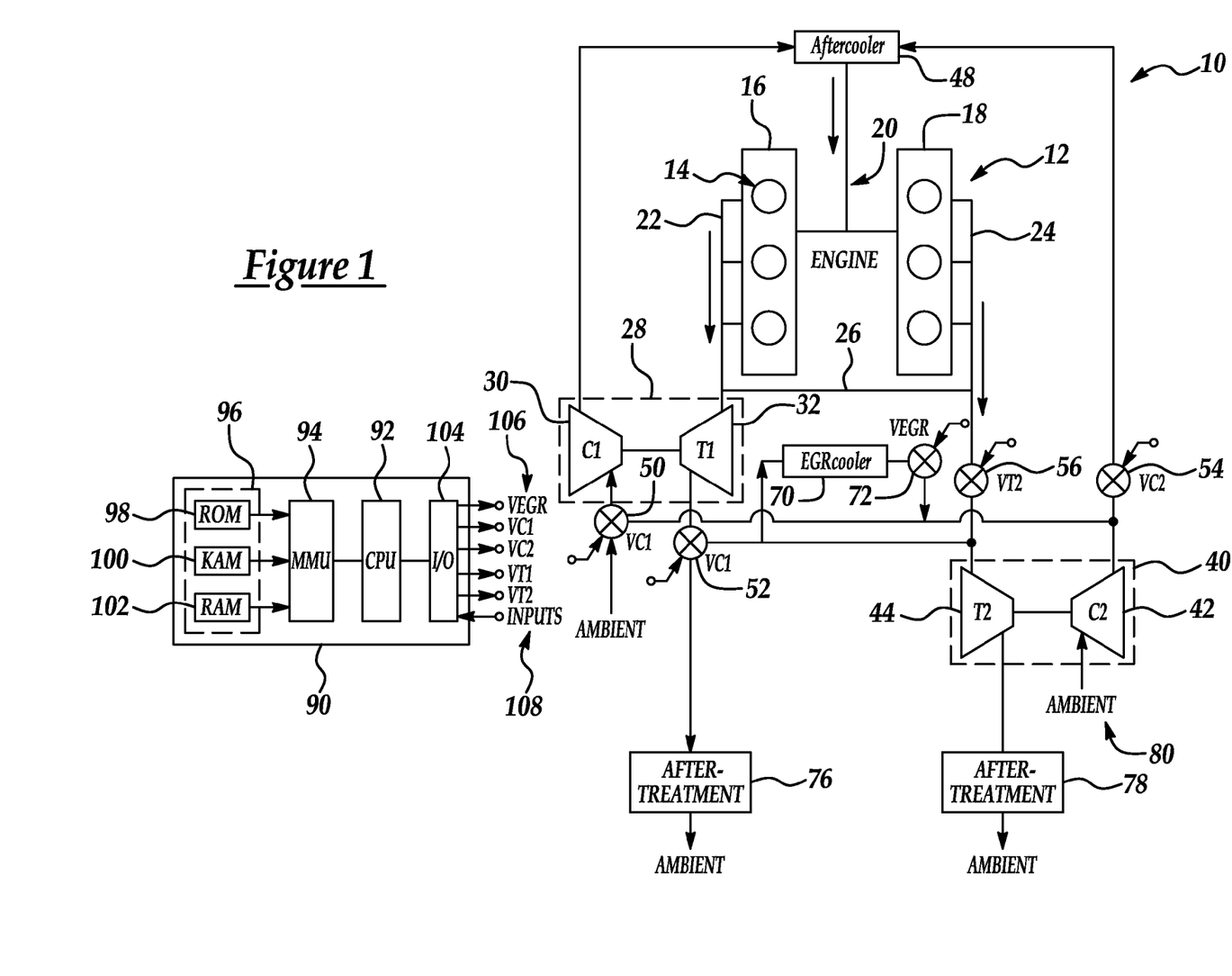
FIG. 1 is a block diagram illustrating a system or method for turbocharging an internal combustion engine according to one embodiment of the present invention.

A block diagram illustrating a system or method for turbocharged an internal combustion engine according to one embodiment of the present invention is shown in FIG. 1. As illustrated in FIG. 1, system 10 includes an internal combustion engine 12 having a plurality of cylinders 14. In the example illustrated in FIG. 1, cylinders 14 are arranged in two banks 16 and 18. However, the present invention is independent of the particular cylinder arrangement and may also be applied to in-line configurations, for example. Similarly, while a six-cylinder engine is illustrated, the present invention may be applied to internal combustion engines having any number of cylinders. Preferably, the present invention is applied to turbocharged internal combustion engines utilizing compression ignition technology, such as diesel engines. However, those of ordinary skill in the art will recognize that the present invention is generally independent of the particular type of engine.

Intake manifold and plenum, generally represented by reference numeral 20, distribute intake air to cylinder banks 16 and 18. In the example illustrated in FIG. 1, each cylinder bank 16, 18 includes a corresponding exhaust manifold 22, 24, respectively, having a common connecting section 26. System 10 preferably includes a first turbocharger 28 associated with first bank of cylinders 16. Turbocharger 28 is constructed in a conventional manner and includes a compressor 30 mounted on a common shaft to a turbine 32. System 10 also includes a second turbocharger 40 having a compressor 42 and turbine 44 mounted on a common shaft. Preferably, turbochargers 28 and 40 are variable geometry turbochargers (VGT) or variable nozzle turbochargers (VNT) that include an adjustable turbine nozzle orifice size or vane angle to improve the efficiency and boost for low mass flow operating regions while maintaining high mass flow capacity at higher engine speeds. Depending upon the particular application, the present invention may be implemented using conventional turbochargers or a combination of conventional and variable geometry turbochargers. However, to improve system flexibility and efficiency, at least turbocharger 28 (high pressure) is preferably a VNT or VGT as described in greater detail below.

According to the present invention, turbochargers 28, 40 may be sized smaller than conventional two stage turbocharger applications to lower inertia and improve transient response because additional air handling capacity is provided by operating the turbochargers in a parallel configuration. Turbochargers 28, 40 are preferably substantially similarly sized to reduce system complexity and provide appropriate pressure balancing. However, those of ordinary skill in the art will recognize that the present invention may be applied to twin turbocharger configurations having turbochargers of different sizes with balancing provided by appropriate operation of one or more variable geometry turbochargers, for example.

System 10 includes a plurality of flow control devices or valves such as intake flow control valves 50 and 54 and exhaust flow control valves 52 and 56 that may be selectively actuated to operate turbochargers 28, 40 in either a series or parallel configuration based on current operating conditions. Depending upon the particular application and implementation, one or more of the flow control devices may be incorporated into the housing of a corresponding turbocharger. Likewise, turbochargers 28, 40 may share various components and/or be incorporated in a common housing, or may be entirely independent.

Intake flow control valve 50 and exhaust flow control valve 52 are preferably electronically controlled pressure activated three-way switching valves, although vacuum activated valves could also be used with pneumatic or hydraulic activation depending on the particular application. Intake flow control valve 54 and exhaust flow control valve 56 are preferably electronically controlled pressure activated two-way (on/off) valves. In the embodiment illustrated in FIG. 1, the plurality of valves is actuated to reconfigure intake airflow through compressors 30, 42 as well as exhaust flow through turbines 32, 44 to operate in a series configuration or a parallel configuration based on engine and/or ambient operating conditions. In an alternative embodiment illustrated and described with reference to FIG. 4, the airflow through only the compressors is reconfigured when switching the turbochargers from series to parallel operation.

Exhaust gas recirculation (EGR) is provided by directing a portion of the exhaust gas through EGR cooler 70 with the rate of EGR controlled by an appropriate flow control device, such as a proportional EGR valve 72. According to the present invention, control of the plurality of intake and exhaust flow control valves in combination with EGR valve 72 may be used to provide a "floating EGR" feature, i.e. low-pressure EGR supplied to the inlet of a compressor for a first operating range and high-pressure EGR that bypasses the compressors and is supplied to intake manifold 20 via aftercooler 48 for a second operating range. System 10 may also include one or more emission control or after treatment devices positioned downstream of turbochargers 28, 40. In the embodiment illustrated in FIG. 1, each bank of cylinders 16, 18 includes a corresponding after treatment device 76, 78, respectively. The present invention may be used to reduce the amount of time for an after treatment device, such as device 76, to reach operating temperature by directing all exhaust gas generated by both cylinder banks 16, 18 through a single one of the after treatment devices. This may be accomplished by appropriate actuation of valve 52 to place turbochargers 28, 40 in a series configuration as described in greater detail below. Alternatively, a separate exhaust flow control valve may be provided to selectively redirect or couple the outlet of one of the turbines to the outlet of the other turbine so that all exhaust passes to ambient or atmosphere 80 through a common after treatment device independently of the series or parallel configuration of turbochargers 28, 40 to reduce warm-up time or maintain a desired operating temperature of after treatment device 76 or 78 under various operating conditions, such as light load, for example.

As one of ordinary skill in the art will appreciate, system 10 includes various conventional sensors and actuators in addition to those illustrated in FIG. 1 to control engine 12. The sensors and actuators, including turbochargers 28, 40 and valves 50, 52, 54, 56, and 72, preferably communicate with at least one controller 90 that includes a microprocessor 92, also called a central processing unit (CPU), in communication with a memory management unit (MMU) 94. MMU 94 controls movement of data and/or instructions among various computer readable storage media 96 and communicates data to and from CPU 92. The computer readable storage media preferably include volatile and nonvolatile or persistent storage in read-only memory (ROM) 98, keep-alive memory (KAM) 100, and random-access memory 102, for example. KAM 100 may be used to store various engine and/or ambient operating variables while CPU 92 is powered down. Computer-readable storage media 96 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 92 in controlling engine 12 or a vehicle into which the engine is mounted. Computer-readable storage media 96 may also include floppy disks, CD-ROMs, hard disks, and the like depending upon the particular application. CPU 92 communicates with the sensors and actuators via an input/output (I/O) interface 104. Interface 104 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 92. In addition to the illustrated actuators 106, examples of other devices that may be actuated under control of CPU 92, through I/O interface 104, include VGT or VNT rack position, EGR rate, fuel injection timing, fuel injection rate, fuel injection duration, throttle valve position and spark plug ignition timing (where engine 12 is a spark-ignition engine), and others. Sensors communicating input, generally represented by reference numeral 108, through I/O interface 104 may be used to indicate piston position, engine rotational speed, turbo wheel speed, vehicle speed, coolant temperature, intake manifold pressure, turbo boost, accelerator pedal position, air temperature, exhaust temperature, exhaust air to fuel ratio, exhaust component concentration, and demanded or actual air flow, for example. Some controller architectures do not contain an MMU 94. If no MMU 94 is employed, CPU 92 manages data and connects directly to ROM 98, KAM 100, and RAM 102. Of course, the present invention could utilize more than one CPU 92 to provide engine control and controller 90 may contain multiple ROM 98, KAM 100, and RAM 102 coupled to MMU 94 or CPU 92 depending upon the particular application.

Figure 2:
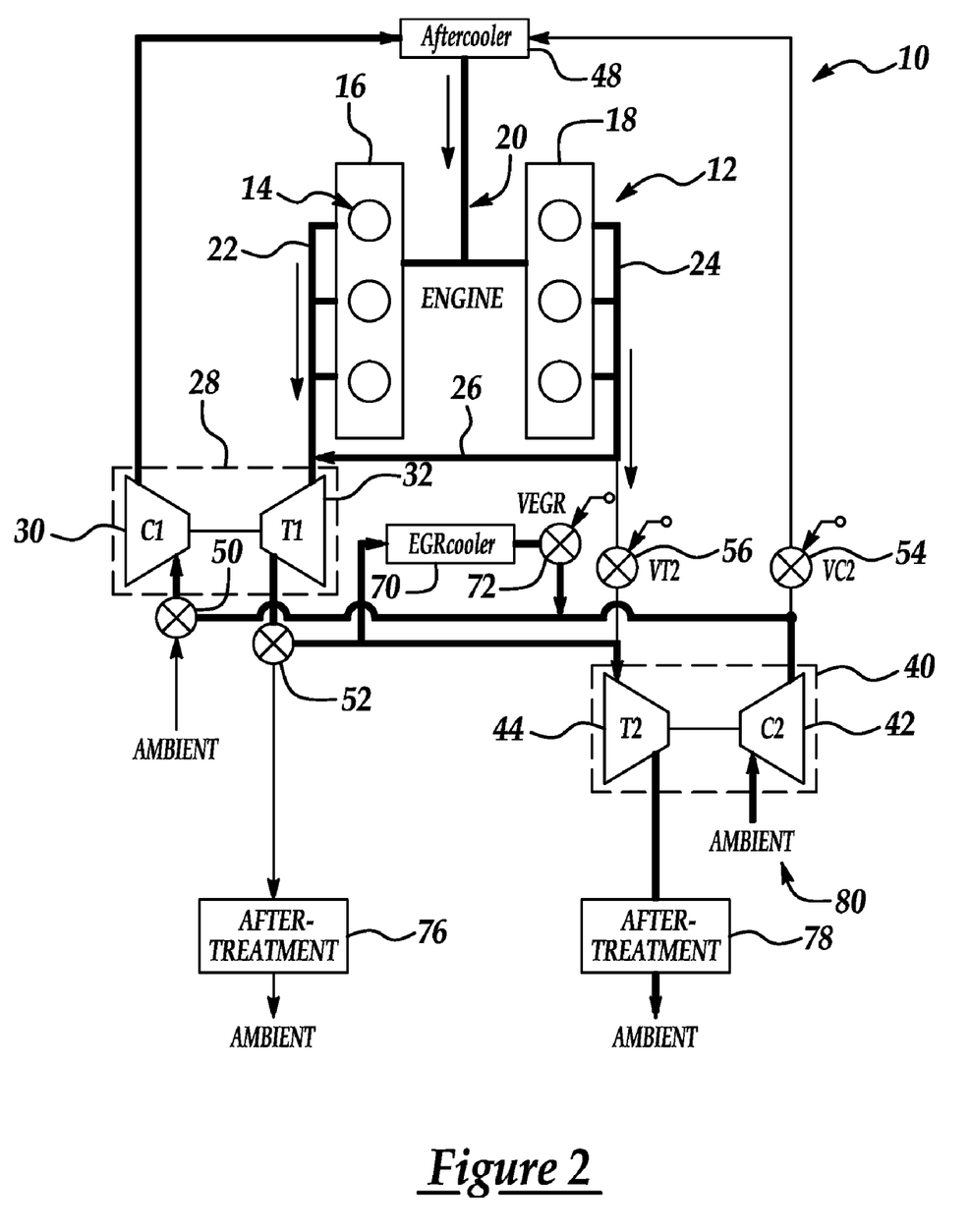
FIG. 2 is a block diagram illustrating intake and exhaust flow for twin turbochargers operating in a series configuration in a system or method for controlling a turbocharged internal combustion engine according to various embodiments of the present invention.
Figure 3:
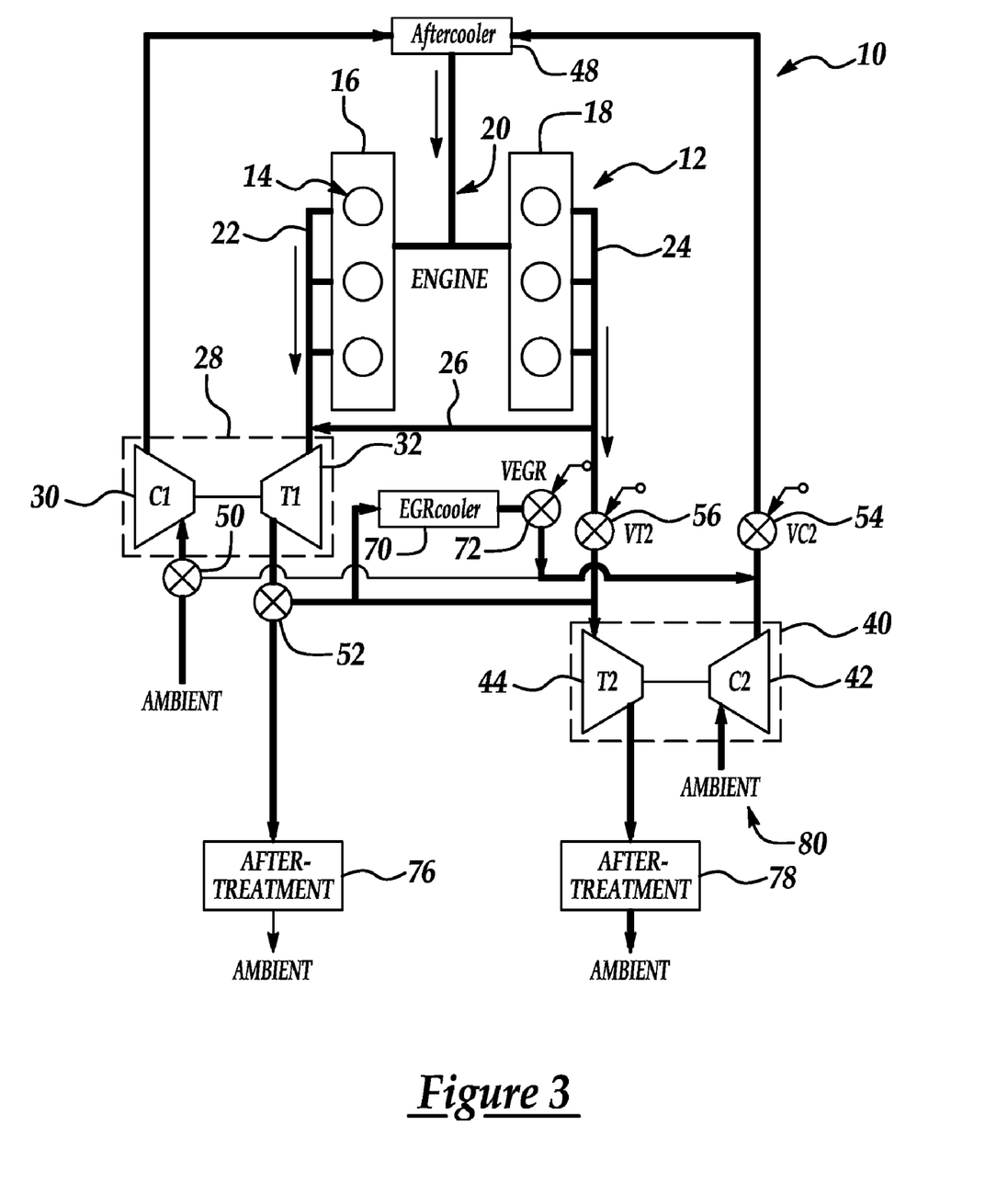
FIG. 3 is a block diagram illustrating intake and exhaust flow for twin turbochargers operating in a parallel configuration in a system or method for controlling a turbocharged internal combustion engine according to various embodiments of the present invention.
Figure 4:
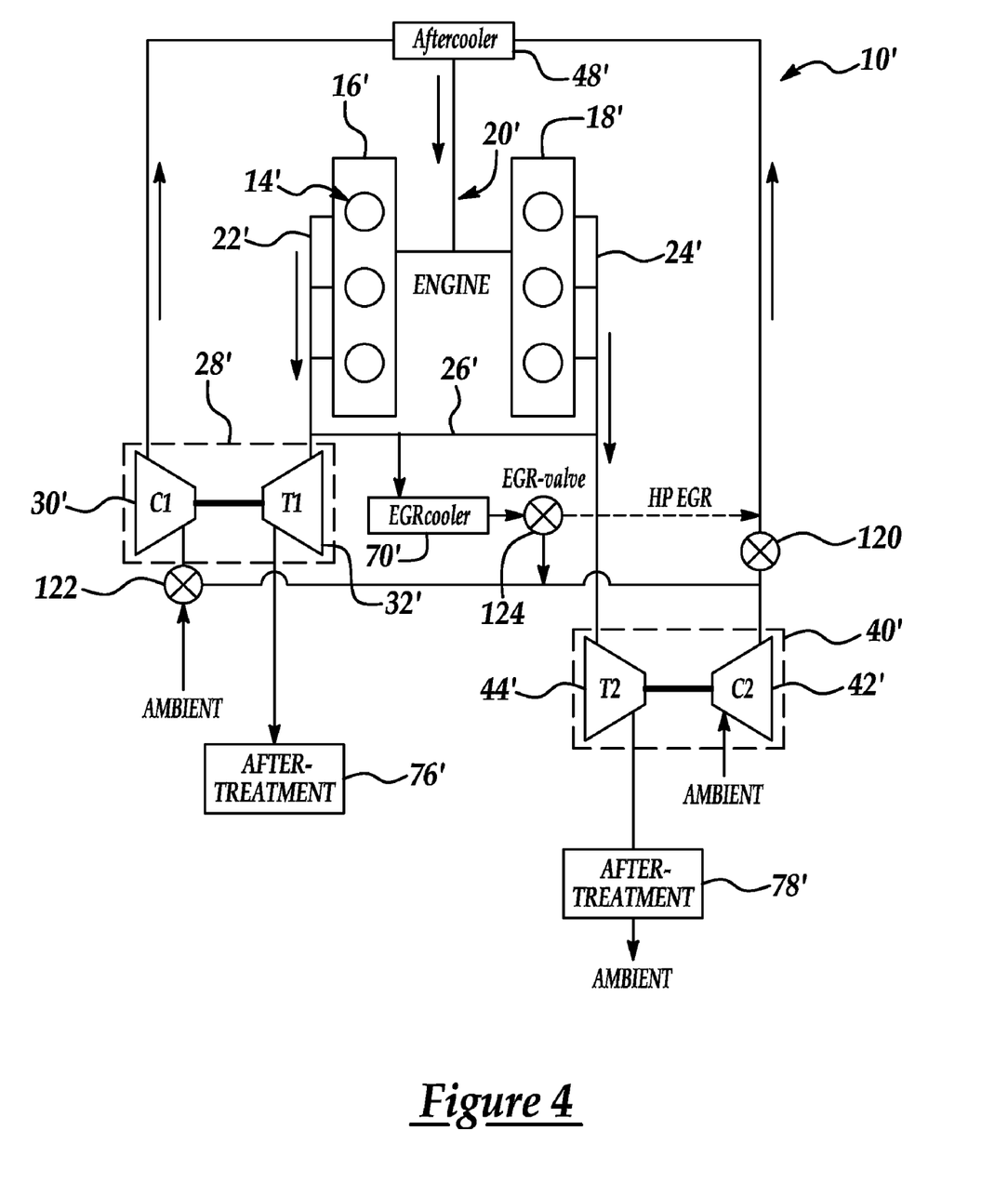
FIG. 4 is a block diagram illustrating operation of a system or method for turbocharging an internal combustion engine having twin turbochargers with compressors switchable between series and parallel configurations and turbines arranged in a fixed parallel configuration according to the present invention.

In operation, controller 90 selectively actuates intake flow control valves 50, 54 and exhaust flow control valves 52, 54 to operate turbochargers 28, 40 in a series configuration or a parallel configuration based on current engine and/or ambient operating conditions as described and illustrated in greater detail with respect to FIGS. 2–4. Preferably, the turbocharger configuration is controlled based on demanded airflow, which in turn may be determined based on a demanded or desired air/fuel ratio and requested or demanded engine speed and torque, for example.

Referring now to FIG. 2, a block diagram illustrating intake and exhaust flow for twin turbochargers operating in a series configuration in a system or method for controlling a turbocharged internal combustion engine according to various embodiments of the present invention is shown. Controller 90 (FIG. 1) actuates intake flow control valves 50, 54 to couple the outlet of secondary or low-pressure compressor 42 to the inlet of primary or high-pressure compressor 30. In addition, exhaust flow control valves 52, 56 are controlled to couple the outlet of primary turbine 32 to the inlet of secondary turbine 44. As illustrated, intake flow control valve 50 blocks ambient air 80 while directing higher pressure intake air from the outlet of compressor 42 to the inlet of compressor 30. The outlet of compressor 30 is coupled to intake manifold 20 via aftercooler 48. Exhaust gas exiting cylinder bank 18 travels through exhaust manifold 24 and is blocked by exhaust flow control valve 56 such that it is redirected and combined with exhaust from cylinder bank 16 such that all exhaust generated by engine 12 passes through primary or high-pressure turbine 32 of turbocharger 28. Exhaust flow control valve 52 redirects exhaust from the outlet of turbine 32 to the inlet of turbine 44 of turbocharger 40. EGR valve 72 is selectively controlled to provide a portion of exhaust gas via EGR cooler 70 to the inlet of compressor 30 of turbocharger 28 (or outlet of compressor 42 of turbocharger 40). As such, in the series configuration illustrated, compressor 30 of turbocharger 28 effectively functions as an EGR pump with appropriate control of the flow control valves to provide low-pressure EGR. This increases the airflow through compressor 30 by combining EGR with intake airflow to improve operating efficiency and surge margin. In addition, routing all exhaust through turbine 32 prior to diverting any exhaust flow for EGR increases the wheel speed and also contributes to improved operating efficiency and higher boost at low speed and load. As such, operation of turbochargers 28, 40 in the series configuration illustrated in FIG. 2 provides various advantages typically associated with conventional two-stage sequential series turbocharger systems having low-pressure EGR. However, the ability to reconfigure the EGR to provide high-pressure EGR in combination with the ability to reconfigure the intake and/or exhaust flow to subsequently operate turbochargers 28, 40 in a parallel configuration (to accommodate higher airflow at higher engine speeds) according to the present invention avoids some of the disadvantages of a conventional series configuration with either low-pressure or high-pressure EGR.

Prior art turbocharger systems that utilize a series configuration typically have a smaller high pressure stage to improve transient response. At high engine speeds, the high pressure stage is bypassed to avoid choking of the compressor at higher airflows, reducing overall system efficiency. During transients and at low engine speeds and loads, the low-pressure stage turbocharger (typically the larger) does not contribute significantly to boost due to its larger inertia and poor aerodynamic efficiency in this operating region. In contrast, the present invention allows use of relatively smaller turbochargers with associated lower rotational and thermal inertia to contribute more to boost buildup at low engine speeds, improve transient response, and reduce warm-up time for emission control or after treatment devices. The ability to reduce the time required for boost buildup during transients may also reduce smoke and particulate emissions. In addition, the reduced thermal inertia or heat capacity in combination with selective routing of exhaust flow through a designated after treatment device may reduce the time required for the after treatment device to reach a desired operating temperature.

Selective use of low-pressure EGR during series operation of the turbochargers according to the present invention provides a number of advantages. In general, low-pressure EGR improves turbocharger efficiency by increasing airflow through the compressor at low speeds so the turbocharger operates in a more efficient aerodynamic range resulting in improved engine idle stability and vehicle launch capability. In addition, the use of low-pressure EGR does not require the turbine to be sized such that the turbine inlet pressure is higher than intake manifold pressure to maintain a required EGR flow. As such, pumping loss is reduced (because only the recirculated portion of the exhaust is pumped back into the intake via the compressor rather than elevating the entire exhaust pressure to drive EGR) and may result in improved fuel economy.

FIG. 3 is a block diagram illustrating intake and exhaust flow for twin turbochargers operating in a parallel configuration in a system or method for controlling a turbocharged internal combustion engine according to various embodiments of the present invention. Based on current operating conditions, which may include demanded or requested airflow, for example, system 10 transitions from the series configuration illustrated in FIG. 2 to the parallel configuration illustrated in FIG. 3 via appropriate actuation of the plurality of flow control devices by controller 90 (FIG. 1). For example, in a representative application, system 10 transitions from series to parallel operation of turbochargers 28, 40 when mass airflow exceeds a corresponding threshold, such as half of total mass airflow. The particular operating conditions including one or more parameter or threshold values used to trigger a transition between series and parallel operation of the turbochargers may vary depending upon various application and implementation specific parameters including the flow capacity of the high-pressure turbocharged and the boost from the low-pressure compressor, for example.

When transitioning from series to parallel operation of turbochargers 28, 40, in this embodiment, intake airflow control valve 50 switches to provide intake air from ambient 80 rather than the outlet of compressor 42; intake flow control valve 54 switches to couple the outlet of compressor 42 to intake manifold 20 via after cooler 48; exhaust flow control valve 50 to switches to couple the outlet of turbine 32 to ambient 80 (via after treatment device 76) rather than the inlet of turbine 44; and exhaust flow control valve 56 switches to couple exhaust manifold 24 to the inlet of turbine 44.

Transitioning from series to parallel operation of turbochargers 28, 40 may result in a momentary but significant decrease in wheel speeds and airflow for both turbochargers in implementations of the present invention using conventional turbochargers. This occurs when the inlet to compressor 30 is switched from the outlet of compressor 40 to the lower pressure ambient 80 and a portion of the exhaust directed through turbine 32 in the series configuration is redirected to turbine 44 in the parallel configuration resulting in a decrease of the exhaust energy. In addition, air from the outlet of compressor 42 exerts high-pressure on valve 54 which may choke the compressor. These effects may be reduced or eliminated according to the present invention by using at least one variable geometry turbocharger. Use of a VGT for the secondary/low-pressure turbocharger 40 allows for a selective reduction in turbine vane angle or nozzle orifice size during the series to parallel transition to limit the effect of the redirected exhaust flow while increasing the secondary output pressure more quickly to achieve a faster and smoother transition. This may be accomplished by controlling turbocharger 40 to maintain a minimum rack position for a period of time during the transition before opening it to match the required airflow. Similarly, appropriate control of a VGT for the primary/high-pressure turbocharger 28 may improve the initial boost buildup to improve the transient response and maintain the requested EGR ratio during the transition.

After completing the transition from series mode as illustrated in FIG. 2 to parallel mode as illustrated in FIG. 3, intake air from ambient 80 passes through compressors 30, 42 of turbochargers 28, 40, respectively, and is delivered to intake manifold 20 via aftercooler 48. The exhaust from cylinder bank 16 passes through exhaust manifold 22 and through turbine 32 of turbocharger 28 while exhaust from cylinder bank 18 passes through exhaust manifold 24 and through turbine 44 of turbocharger 40. Exhaust gas recirculation (EGR) is provided upstream of the inlet to turbine 44 in this particular example. EGR passes through EGR cooler 70, with the rate controlled by proportional EGR valve 72, and is delivered as high-pressure EGR to the outlet of compressor 42. Stated differently, high-pressure EGR is provided directly to intake manifold 20 (via aftercooler 48). Of course, depending upon the particular implementation, EGR may be sourced from either of the exhaust manifolds 22, 24 or the connecting portion 26. Exhaust gas passing through turbine 32 then passes to ambient 80 via after treatment device 76 while exhaust passing through turbine 44 passes through after treatment device 78 before reaching ambient 80.

Based on current engine and/or ambient operating parameters/conditions, system 10 then transitions from the parallel configuration illustrated in FIG. 3 to the series configuration illustrated in FIG. 2 in a similar fashion by operation of intake flow control valves 50, 54 and exhaust flow control valves 52, 56.

FIG. 4 is a block diagram illustrating operation of a system or method for turbocharging an internal combustion engine having twin turbochargers with compressors switchable between series and parallel configurations, and turbines arranged in a fixed parallel configuration according to the present invention. The primed reference numerals of FIG. 4 correspond to elements having a similar structure and function to those previously described and illustrated with reference to unprimed elements in FIGS. 1 3. In the embodiment of FIG. 4, intake flow control device 120 is a two-way (On/off) valve and intake flow control device 122 is a three-way switching valve. Intake flow control devices 120, 122 communicate with a corresponding controller (not specifically illustrated) to transition system 10' between a series configuration and parallel configuration. However, in this embodiment, exhaust gas from cylinder banks 14', 18' passes through turbines 32' and 44', respectively, in both configurations as described in greater detail below.

The embodiment of FIG. 4 includes a "floating EGR" feature with exhaust gas sourced from connecting portion 26' of the exhaust manifold and delivered through EGR cooler 70' and EGR valve 124 as low-pressure EGR to the inlet of compressor 30' in the series configuration or as high-pressure EGR delivered to the outlet of compressor 42' in the parallel configuration. Alternatively, the embodiment of FIG. 4 may include a high-pressure EGR loop (HP EGR) rather than the "floating EGR" feature such that EGR is delivered downstream of the compressors in either configuration.

In operation, system 10' determines an appropriate turbocharger operating configuration based on current engine and/or ambient operating conditions. In the series configuration, valve 120 is closed so that intake air passes from ambient through compressor 42' and valve 122 to the inlet of compressor 30'. Valve 122 also blocks inlet air from ambient. The compressed air passes from the outlet of compressor 30' to intake manifold 20' via aftercooler 48'. Exhaust gas from cylinder banks 22', 24' is routed through corresponding turbines 32', 44' and after treatment devices 76', 78', respectively. Exhaust gas recirculation rate is controlled by proportional EGR valve 124 with exhaust gas supplied from connecting portion 26' of the exhaust manifold through EGR cooler 70' to the inlet of compressor 30'.

System 10' transitions from a series configuration to a parallel configuration based on engine and/or ambient operating conditions/parameters by appropriate actuation of intake flow control devices 120, 122. More particularly, valve 120 is opened to couple the outlet of compressor 42' to intake manifold 20' (via aftercooler 48'), while valve 122 is switched to connect the inlet of compressor 30' to ambient and block compressed air from the outlet of compressor 42'. Compressed air from the outlet of compressor 30' is combined with air from the outlet of compressor 40' and delivered to intake manifold 20'. Exhaust gas from cylinder banks 22', 24' passes through turbines 32', 44', which remain in a parallel configuration, and after treatment devices 76', 78', respectively. Exhaust gas recirculation is supplied as high-pressure EGR from connecting portion 26' of the exhaust manifold to the intake manifold 20' via aftercooler 48'. Stated differently, high-pressure EGR is supplied to the outlet of compressor 42'. System 10' transitions from the parallel configuration to the series configuration in a similar manner based on engine and/or ambient operating conditions/parameters. For systems incorporating a high-pressure EGR loop 126, exhaust gas recirculation is delivered downstream of valve 120, i.e. directly to intake manifold 20', in both the series and parallel configurations.

As those of ordinary skill in the art will appreciate, a configuration similar to that illustrated in FIG. 4 has the advantages of a selectable series/parallel configuration while avoiding any difficulties or disadvantages relative to system complexity or durability associated with redirecting the hot exhaust gases passing through the turbines.

Figure 5:
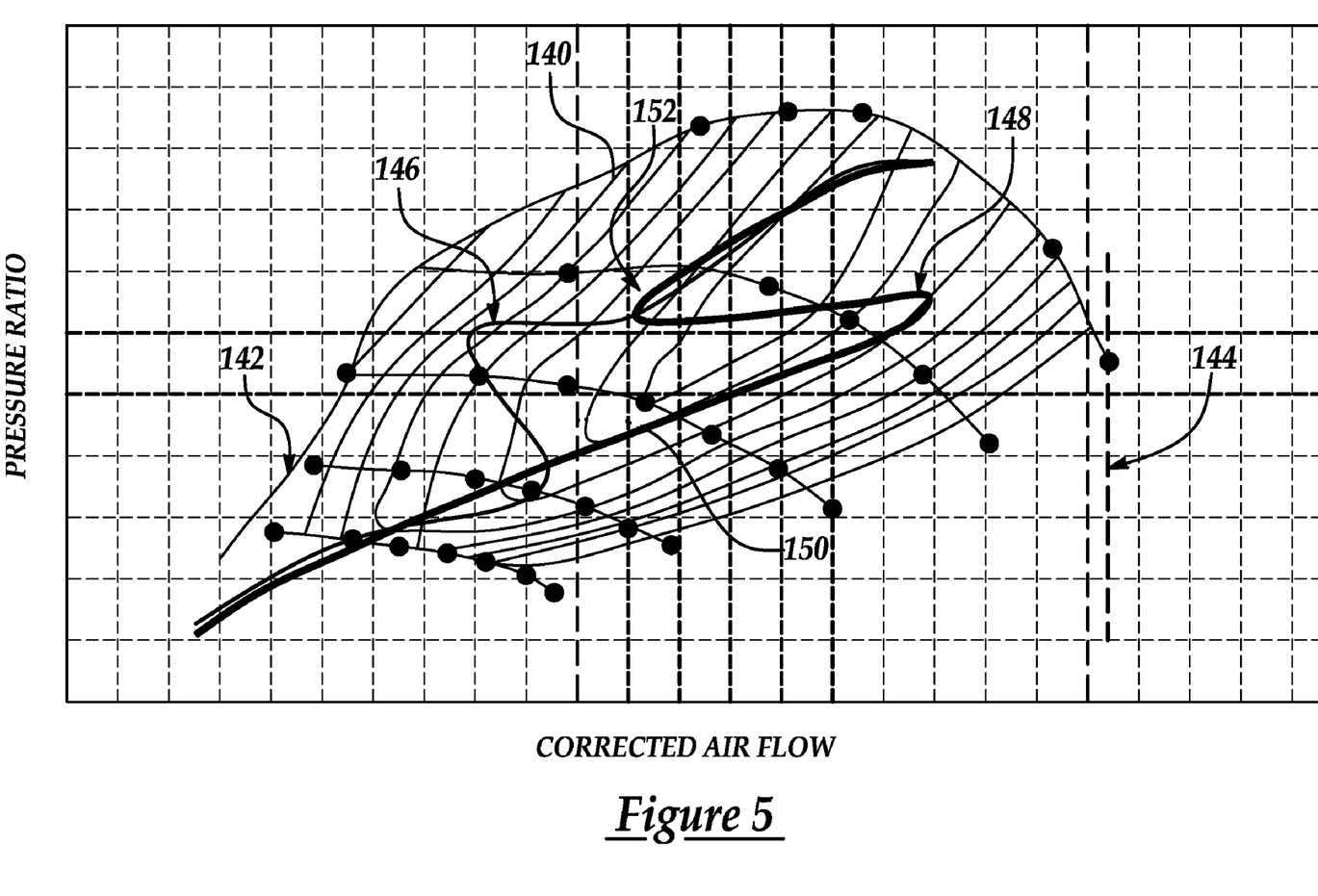
FIG. 5 is a compressor map illustrating representative operating lines for high and low pressure compressors in a system or method for turbocharging an internal combustion engine according to the present invention.
Figure 6:
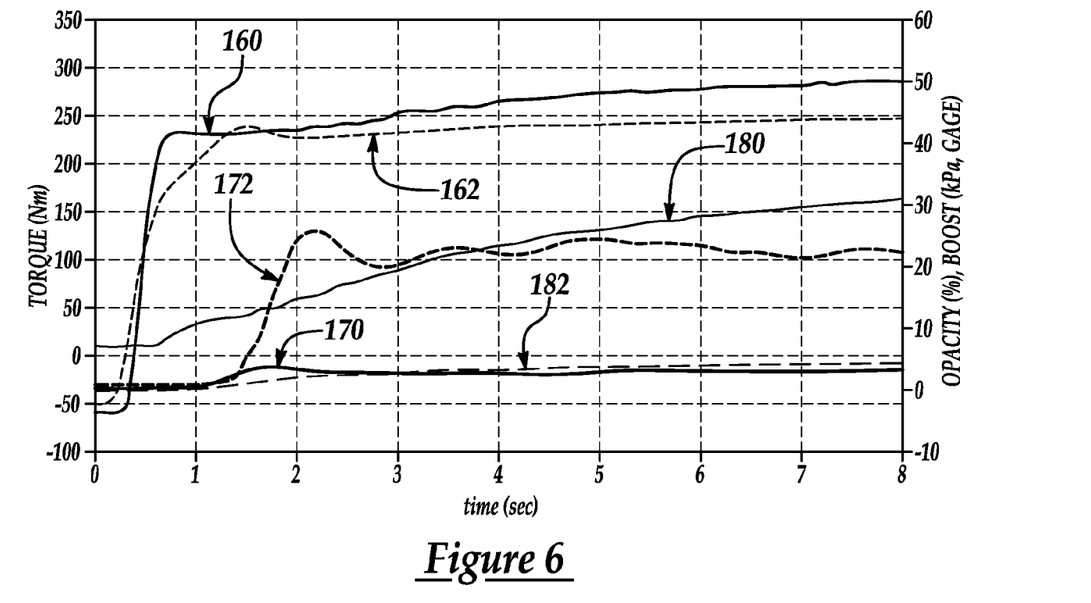
FIGS. 6 and 7 are graphs illustrating performance improvements of a turbocharged compression ignition internal combustion engine according to one embodiment of the present invention.

FIG. 5 is a compressor map illustrating representative full load operating lines 140 from idle to rated speed for high end low pressure compressors in a system or method for turbocharging an internal combustion engine according to the present invention. The compressor map of FIG. 6 plots pressure ratio as a function of corrected airflow for twin turbochargers switchable between series and parallel configurations according to the present invention. As shown in the compressor map of FIG. 5, the present invention provides for operation of both turbochargers across the entire operating range of the engine from idle to rated speed. In addition, the present invention facilitate operation of both turbochargers in on aerodynamically efficient region away from surge line 142 and choke line 144. Line 146 represents operation of the high-pressure compressor, i.e. the downstream compressor when arranged in the series configuration. Line 148 represents operation of the low-pressure compressor, i.e. the upstream compressor when arranged in the series configuration and whose inlet is connected to ambient in both configurations. As shown in FIG. 5, the compressors operate along similar lines for lower corrected airflows in the series configuration and begin to diverge before the system transitions from series to parallel operation as indicated generally at 150. As the outlet pressure from low pressure compressor 42 increases, the high-pressure compressor operating line 146 diverges from low-pressure compressor operating line 148. Operating lines 146, 148 converge again when the transition has been completed as represented generally at 152 and follow a similar operating line for higher corrected airflows. As illustrated in FIG. 5, in contrast to a conventional series sequential turbocharger system, both turbochargers in a system or method according to the present invention are utilized across the entire operating range from idle to full rated engine speed, i.e. neither of them are bypassed or idled and are therefore fully utilized in addition, both turbochargers work in a narrower operation range because each turbocharger handles approximately half of the charge airflow so that both can be sized to work primarily in an aerodynamically efficient operating region.

Figure 7:
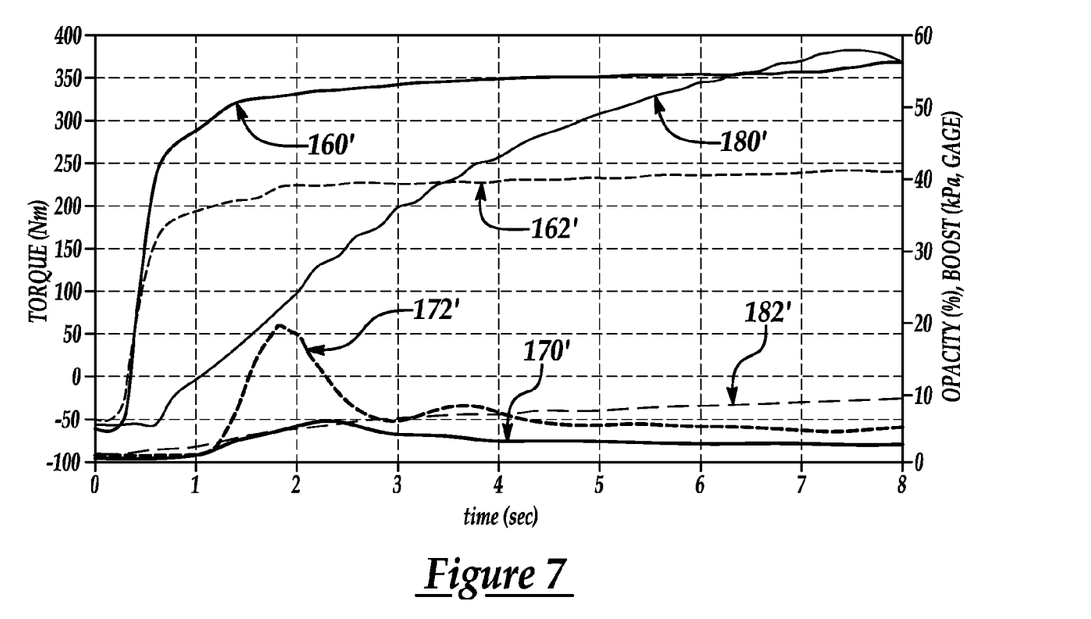

FIGS. 6 and 7 are graphs illustrating performance improvements of a turbocharged compression ignition internal combustion engine according to one embodiment of the present invention. The plots of FIGS. 6 and 7 compare performance of a representative embodiment of the present invention to a conventional regulated two-stage turbocharger system.

FIG. 6 is a graph illustrating load step response at 750 rpm. The graph of FIG. 6 illustrates the improvement in torque, opacity (smoke), and boost pressure as a function of time for a series/parallel twin turbocharger configuration according to the present invention relative to a conventional regulated two-stage turbocharger configuration. Line 160 corresponds to engine brake torque generated by an engine turbocharged according to the present invention compared to line 162 that corresponds to engine brake torque generated by a similar engine using a conventional regulated two-stage turbocharger system. As illustrated, the present invention provides a faster torque response than a conventional system. Line 170 illustrates the reduction in opacity (smoke) for a turbocharger system according to the present invention relative to the opacity of a similar system using a conventional turbocharger system as represented by line 172. The improved torque response and reduction in opacity likely result from the increased boost pressure provided by the present invention as represented by line 180 as compared to the boost pressure provided by a conventional turbocharger system as represented by line 182.

FIG. 7 illustrates similar improvements in torque, opacity, and boost pressure for a load step response at 1000 rpm with the primed reference numerals of FIG. 7 corresponding to the parameters associated with unprimed numerals described above with reference to FIG. 6.

Figure 8:
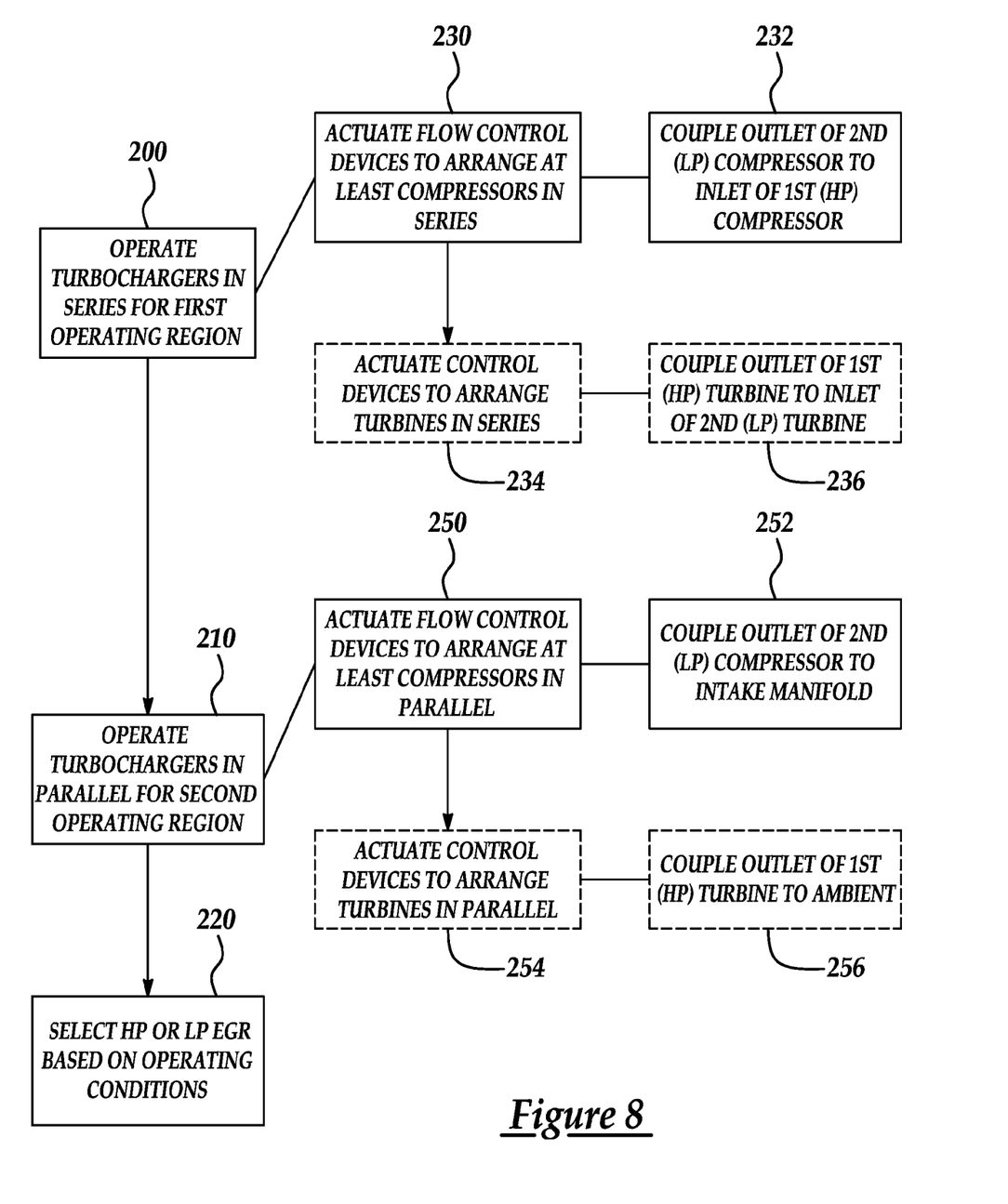
FIG. 8 is a flow chart illustrating operation of a system or method for turbocharging an internal combustion engine according to the present invention.

FIG. 8 is a flow chart illustrating operation of a system or method for turbocharging an internal combustion engine according to the present invention. As those of ordinary skill in the art will appreciate, the diagram of FIG. 8 generally represents control logic that may be implemented by any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy or implementation.

Preferably, the control logic is implemented primarily in software executed by a microprocessor-based engine and/or vehicle controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

The system and method of the present invention include operating twin turbochargers in a series configuration for a first operating region as represented by block 200. The first (and second) operating region may be based on one or more engine and/or ambient operating parameters or conditions. In one embodiment, the first operating region extends to approximately half of total mass airflow. The system and method also include operating the turbochargers in a parallel configuration for a second operating region as represented by block 210. In one embodiment, the second operating region corresponds to beyond approximately half of total mass airflow. The system and method may also include selection of high-pressure or low-pressure exhaust gas recirculation (EGR) based on the operating region or conditions as represented by block 220. Depending upon the particular implementation, selection of high or low-pressure EGR may result from actuation of the same airflow control devices used to operate the turbochargers in a parallel or series configuration, respectively. Alternatively, selection of high-pressure or low-pressure EGR may be controlled independently of the configuration of the turbochargers using one or more additional flow control devices. Likewise, depending upon the particular implementation, EGR may be supplied or sourced upstream of the turbines for high-pressure EGR and downstream of at least one turbine for low-pressure EGR. In general, high-pressure EGR is delivered downstream of any compressor while low-pressure EGR is delivered upstream of at least one compressor so that the compressor acts as an EGR pump. As described above, the additional airflow provided by supplying low-pressure EGR to the compressor inlet may improve the surge margin of the compressor. Similarly, supplying high-pressure EGR to the compressor outlet (or intake manifold) helps to avoid operation near the choke line.

As also shown in FIG. 8, operation of the turbochargers in series may include actuation of a plurality of flow control devices to arrange at least the compressors in series as represented by block 230. The compressors may be arranged in series by coupling the outlet of one of the compressors to the inlet of the other compressor, for example, as represented by block 232. In general, the outlet of the low-pressure compressor coupled to the inlet of the high-pressure compressor with the inlet of the high-pressure compressor being blocked from atmosphere or ambient. The system and method may also include the optional step of actuating one or more flow control devices to arrange at least one of the turbines in series as represented by block 234. This may be effected by coupling the outlet of one turbine to the inlet of the other turbine as represented by block 236, for example.

Operating the turbochargers in parallel as represented by block 210 may include actuating a plurality of flow control devices to arrange at least the compressors of the turbochargers in parallel as represented by block 250. The compressors may be arranged in parallel by coupling the outlets of the compressors to the intake manifold, as represented by block 252, rather than coupling one compressor to another as described above with respect to the series configuration. Stated differently, when the compressors are arranged in parallel, each compressor inlet is coupled to ambient with each compressor outlet coupled directly or indirectly to the intake manifold. Depending upon the particular implementation, the system and method may also include actuation of various flow control devices to arrange the turbines of the compressors in parallel as represented by block 254. This may include coupling the outlets of the turbines to ambient or atmosphere as represented by block 256, rather than coupling the turbines to each other as described above with reference to the series configuration. Stated differently, when connected in parallel, each turbine inlet is coupled to the exhaust manifold and each turbine outlet is coupled directly or indirectly to atmosphere.

Those of ordinary skill in the art will recognize that the selectable turbocharger configuration according to the present invention provides a two stage series configuration that generates more boost for improved vehicle launch compared to a sequential parallel configuration that only uses one stage at low engine speeds, while providing a parallel configuration to provide sufficient air handling capacity at higher engine speeds using smaller turbochargers with lower inertia to improve turbocharger transient response across the entire operating range. Furthermore, the sequential operation of twin turbochargers in a series configuration followed by a parallel configuration according to the present invention provides improved performance in terms of airflow, turbo wheel speed, and air pressure build up during transients relative to previous approaches. In addition, the switchable or floating exhaust gas recirculation feature according to the present invention may selectively provide more exhaust gas to power the first turbine with termination upstream of the compressor to improve surge margin at lower speeds while sourcing EGR upstream of the first turbine with termination downstream of the compressor at higher speeds to avoid choking at full load.

Operation of the twin turbochargers in a series configuration according to the present invention may also reduce the time required for emission control or exhaust after treatment devices to reach desired operating temperatures by directing all exhaust through one or more designated devices. Optional exhaust switching according to the present invention may be used to control exhaust flow and temperatures of primary and secondary after treatment devices to conduct sequential after treatment regeneration and extend the life of the after treatment system.

While the best mode for carrying out the invention has been described in detail, those familiar with the art to which this invention relates will recognize various alternative designs and embodiments for practicing the invention as defined by the following claims.

The invention claimed is:

1. A method for controlling a turbocharged internal combustion engine having at least two turbochargers with at least a first compressor and first turbine and a second compressor and a second turbine, respectively, the method comprising:
   operating the turbochargers in a series configuration for a first operating region by selectively connecting an outlet of the first turbine to an inlet of the second turbine; and
   operating the turbochargers in a parallel configuration for a second operating region by decoupling an outlet of the second compressor from an inlet of the first compressor and coupling the outlet of the second compressor to an intake manifold of the internal combustion engine.

2. The method of claim 1 wherein the first and second operating regions correspond to demanded airflow.

3. The method of claim 1 wherein the step of operating the turbochargers in a series configuration comprises selectively connecting an outlet of the second compressor to an inlet of the first compressor.

4. The method of claim 1 further comprising selectively supplying a portion of exhaust gas from downstream of the first turbine to the inlet of the first compressor.

5. The method of claim 1 wherein the step of operating the turbochargers in a parallel configuration further comprises:
   decoupling an outlet of the first turbine from an inlet of the second turbine; and
   coupling the outlet of the first turbine to atmosphere.

6. The method of claim 5 wherein the internal combustion engine includes first and second after-treatment devices disposed downstream of outlets of the first and second turbines, respectively, the method further comprising:
   selectively directing at least a portion of exhaust gas from the outlet of the second turbine to the first after-treatment device based on current operating conditions.

7. A method for controlling a turbocharged internal combustion engine having at least two turbochargers including first and second turbochargers having corresponding first and second turbines and compressors, the method comprising:
   operating the turbochargers in a series configuration for a first operating region;
   operating the turbochargers in a parallel configuration for a second operating region;
   supplying a portion of exhaust gas to an inlet of the first compressor and outlet of the second compressor when operating in the series configuration; and
   supplying a portion of the exhaust gas to the outlet of the second compressor only when operating in the parallel configuration.

8. The method of claim 7 further comprising:
   supplying a portion of exhaust gas from downstream of the first turbine to an inlet of the first compressor when operating in the series configuration; and
   supplying a portion of the exhaust gas from upstream of the second turbine to the outlet of the second compressor only when operating in the parallel configuration.

9. A system for turbocharging an internal combustion engine, the system comprising:
   first and second turbochargers each having an associated compressor and turbine;
   a plurality of flow control devices for selectively routing intake and exhaust flow to and from the first and second turbochargers; and
   a controller in communication with the plurality of flow control devices, the controller selectively actuating the plurality of flow control devices to operate the first and second turbochargers in one of a series configuration and a parallel configuration based on current operating conditions to supply a portion of exhaust gas to an inlet of the first compressor and outlet of the second compressor when operating in the series configuration and to supply a portion of the exhaust gas only to the outlet of the second compressor when operating in the parallel configuration.

10. The system of claim 9 further comprising at least one EGR valve in communication with the controller for selectively providing exhaust gas recirculation, the controller selectively actuating the EGR valve in combination with at least one of the plurality of flow control devices to supply a portion of exhaust gas from downstream of the first turbine when operating the turbochargers in the series configuration and upstream of at least one of the first and second turbines when operating the turbochargers in the parallel configuration.

11. The system of claim 9 further comprising at least one EGR valve in communication with the controller for selectively providing exhaust gas recirculation, the controller selectively actuating the EGR valve in combination with at least one of the flow control devices to supply a portion of exhaust gas from upstream of the first and second turbines to an inlet of one of the compressors when operating in the series configuration, and an outlet of at least one of the compressors when operating in the parallel configuration.

12. The system of claim 9 wherein the controller operates the turbochargers based on current operating conditions including at least demanded airflow.

13. The system of claim 9 wherein the controller actuates the plurality of flow control devices to couple an outlet of the second compressor to an inlet of the first compressor when operating the turbochargers in the series configuration.

14. The system of claim 9 wherein the controller actuates the plurality of flow control devices to couple an outlet of the first turbine to an inlet of the second turbine when operating the turbochargers in the series configuration.

15. The system of claim 9 wherein the plurality of flow control devices comprises:
   a first intake valve for selectively coupling an inlet of the first compressor to ambient or an outlet of the second compressor; and a second intake valve for selectively coupling an outlet of the second compressor to an intake manifold or the inlet of the first compressor.

16. The system of claim 9 wherein the plurality of flow control devices comprises:
a first exhaust valve for selectively coupling and decoupling an inlet of the second turbine to an exhaust manifold; and
at least one additional exhaust valve for selectively coupling an outlet of the first turbine to ambient or an inlet of the second turbine.

17. The system of claim 9 further comprising:
first and second after-treatment devices disposed downstream of the first and second turbines, respectively;
wherein the plurality of flow control devices comprises an exhaust valve for selectively coupling an outlet of the first turbine to at least one of the first and second after-treatment device.

18. A system for turbocharging an internal combustion engine, the system comprising:
first and second turbochargers each having an associated compressor and turbine;
a plurality of flow control devices for selectively routing intake end exhaust flow to and from the first and second turbochargers;
at least one EGR valve for selectively providing exhaust gas recirculation; and
a controller in communication with the plurality of flow control devices and the at least one EGR valve, the controller selectively actuating the plurality of flow control devices to operate the first and second turbochargers in one of a series configuration and a parallel configuration based on current operating conditions and selectively actuating the EGR valve in combination with at least one of the plurality of flow control devices to supply a portion of exhaust gas to an inlet of the first compressor when operating the turbochargers in the series configuration and to an outlet of the second compressor when operating the turbochargers in the parallel configuration.

19. A system for turbocharging en internal combustion engine, the system comprising:
first and second turbochargers each having an associated compressor and turbine;
a plurality of flow control devices for selectively routing intake and exhaust flow to and from the first and second turbochargers; and
a controller in communication with the plurality of flow control devices, the controller selectively actuating the plurality of flow control devices to operate the first and second turbochargers in one of a series configuration, where the outlet of one turbine is coupled to the inlet of another turbine and/or the outlet of one compressor is coupled to the inlet of another compressor and a parallel configuration, where both compressors have inlets coupled to atmosphere and/or both turbines are connected to a common exhaust, based on current operating conditions, wherein the controller actuates the plurality of flow control devices to selectively couple an outlet of the second compressor to an inlet of the first compressor and to selectively couple an outlet of the first turbine to an inlet of the second turbine when operating the turbochargers in the series configuration.

20. A computer readable storage medium having stored data representing instructions executable by a computer for controlling a turbocharged internal combustion engine having at least two turbochargers, the computer readable storage medium comprising:
instructions for operating the turbochargers in a series configuration for a first operating region by actuating a plurality of valves to couple an outlet of a second compressor to an inlet of a first compressor and to couple an outlet of a first turbine to an inlet of a second turbine; and
instructions for operating the turbochargers in a parallel configuration for a second operating region.

21. The computer readable storage medium of claim 20 wherein the instructions for operating the turbochargers in a parallel configuration include instructions for actuating a plurality of valves to connect the turbocharger compressor inlets to ambient and outlets to an intake manifold.

* * * * *